UNITED STATES PATENT OFFICE.

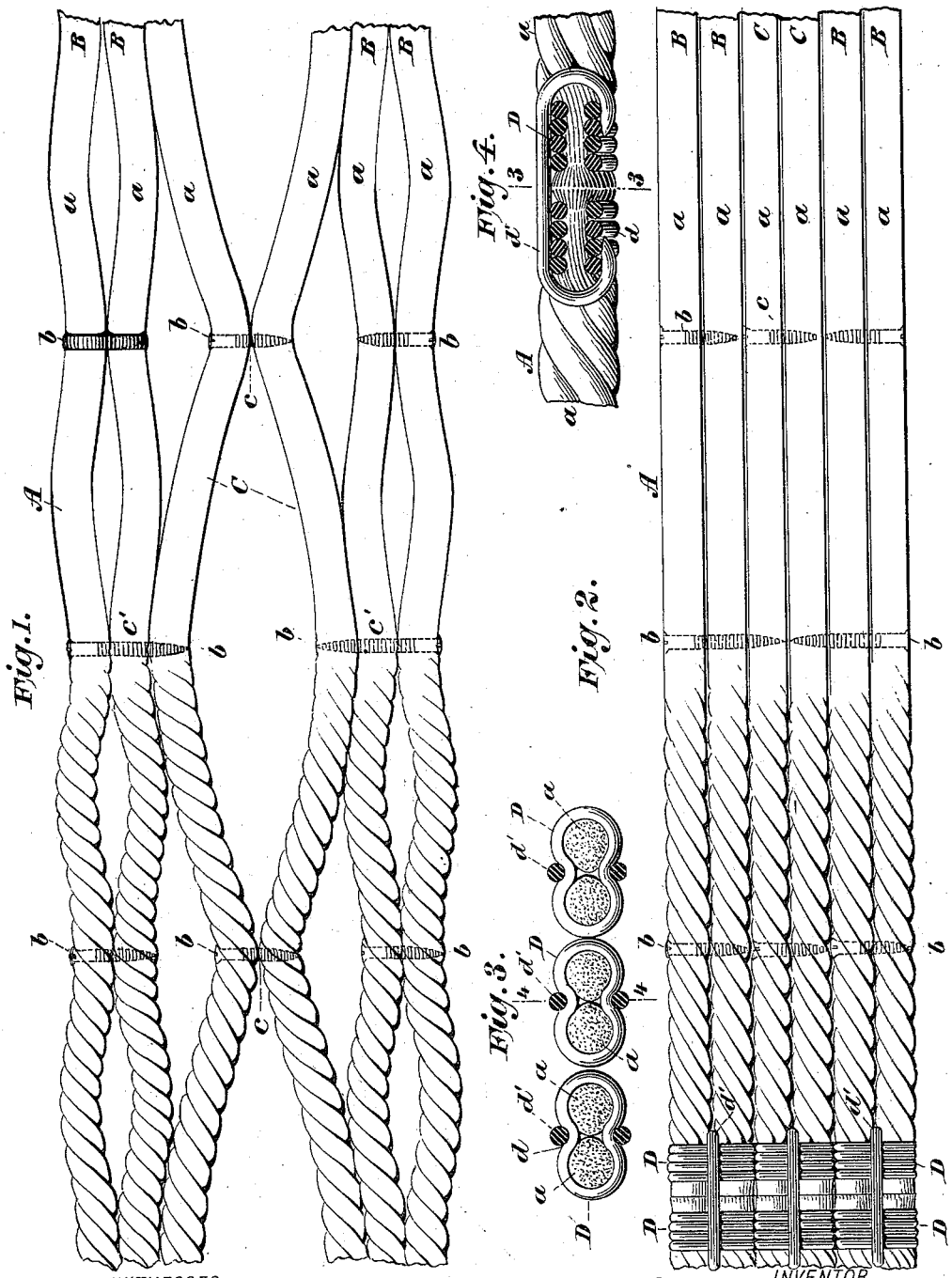

JOHN W. HYATT, OF NEWARK, NEW JERSEY.

ROPE BELTING AND FASTENER THEREFOR.

SPECIFICATION forming part of Letters Patent No. 566,455, dated August 25, 1896.

Application filed March 5, 1894. Serial No. 502,311. (No model.)

*To all whom it may concern:*

Be it known that I, JOHN W. HYATT, a citizen of the United States, and a resident of Newark, in the county of Essex and State of New Jersey, have invented certain new and useful Improvements in Rope Belting and Fasteners Therefor, of which the following is a specification.

My invention relates to improvements in rope belting and devices for securing the ends thereof together.

It has been customary to use a series of ropes upon grooved pulleys, where each rope is independent of the others and runs in grooves on the driving and the driven pulleys.

The object of the present invention, primarily, is to provide rope belting which can be used on the ordinary smooth pulleys, and which may be substituted for the leather, rubber, and other belting now in general use.

A further object is to provide new and novel devices for securing the ends of each rope composing the belt together in a firm and rigid manner, so as not to interfere with the operation of the belt when in use.

With these ends in view my invention consists in the novel rope belting and devices for securing the ends thereof together, as hereinafter described, and pointed out in the claims.

To enable others to readily understand the invention, I have illustrated the same in the accompanying drawings, in which—

Figure 1 is a plan view, in which the ropes are shown arranged loosely to illustrate clearly the manner in which they are fastened together. Fig. 2 is a plan view of the belt, showing the manner in which the two ends are secured together. Fig. 3 is a sectional view on the line 3 3 of Fig. 4, and Fig. 4 is a sectional view on the line 4 4 of Fig. 3.

Referring to the drawings, in which like letters of reference denote corresponding parts in all the figures, A designates the belt, which is composed of the individual ropes $a$, all preferably of the same size and weight and cut in equal lengths.

In the drawings I have shown, as a convenient illustration of my invention, a belt composed of six ropes, which are connected together in a particular manner hereinafter described; but the number of ropes composing the belt is immaterial, and I would therefore have it distinctly understood that I do not limit my invention to any special number or kinds of ropes or to the exact method in which they are fastened together.

As will be clearly seen by reference to Fig. 1, the outer pair of ropes B on each side of the belt are fastened together at intervals by means of suitable fastening devices $b$. The fastening devices hold the ropes securely together, and they may consist of screws, rivets, clamps, or any other devices adapted for a similar purpose, although I have found that ordinary gimlet-pointed screws extending through two or three ropes are preferable. The inner ropes C, as shown, are alternately connected together, as at $c$, and to the adjacent pairs of outer ropes B B, as at $c'$, by the fastening devices $b$.

Belting of this character can be made at much less cost than the leather, rubber, and other belting now in common use, and by connecting the individual ropes together at suitable intervals the belt may be made of any number of ropes and used on the ordinary smooth pulleys. This method of connecting the ropes together at intervals preserves the individuality of each rope to a great degree and permits a flexure and expansion of the belt to enable it to conform to the surface of the pulleys and thus prevent an uneven tension. Owing to the uniform strength of a given grade of rope each rope of the belt will be of practically even length, and it will be free from the common fault of leather belts, which become laterally curved by uneven stretching.

To secure the ends of the belt together, I have devised the following improved means: A wire is tightly wound around the ends of two adjacent ropes to form a band D, and to tighten said band upon the ropes, and for other purposes, each band is pressed by some suitable instrument down into the space between the ropes, thus forming a depression $d$. The bound ends of the ropes are then brought together and fastened by means of a hook $d'$, which fits in the depressed parts of the bands and therefore does not at all interfere with the operation of the belt, as it is practically inclosed between the ropes. The ends of the ropes are thus brought close together, and as the hook grasps each band between the ropes an even tension is exerted upon each rope as the belt is operated.

Instead of winding a wire around the rope ends, as described, suitable metallic bands may be otherwise secured thereon for the same purpose, and when such bands are used they are made large enough to slip easily over the ends of the rope, after which they are secured rigidly thereon by upsetting said bands between the ropes to form the depression $d$. These depressions are preferably of sufficient depth to inclose the hooks within the cross-section of the ropes and bands.

Instead of having the fasteners arranged in one transverse line across the belt, they may be disposed at different points to make the belting continuous.

The hooks $d'$ are the most desirable means for securing the ends of the belt together, but it is obvious that other devices may be employed for this purpose without departing from my invention, as, for instance, links, wires, &c.

I am aware that changes in the form and proportion of parts and details of construction of my invention may be made without departing from the spirit or sacrificing the advantages thereof, and I therefore reserve the right to make all such changes as fairly fall within the scope of the invention.

Having thus fully described my invention, what I claim as new, and desire to secure by Letters Patent, is—

1. A belt, consisting of a series of ropes arranged side by side, the outer pair of ropes on each side being connected together at intervals, and the inner ropes being connected to each other and to the outer pairs of ropes at alternate intervals, all of said ropes being normally in substantial contact with each other, substantially as described.

2. In a rope belting, the combination with a number of ropes arranged side by side, of a series of long fastening devices disposed in pairs at suitable intervals, the fastening devices of each pair being located opposite each other and securing a number of ropes together, and another series of shorter fastening devices arranged in groups alternating with the pairs of longer fastening devices, each of which shorter fastening devices secures together a lesser number of ropes than a long fastening device whereby the ropes are all connected together and the belt is capable of lateral expansion, substantially as described.

3. A belt, consisting of a number of ropes arranged side by side and fastening devices passing transversely through the ropes and connecting two or more of said ropes together at suitable intervals to maintain said ropes normally in substantial contact and permit of lateral expansion of the belt, substantially as described.

4. A belt-fastener for rope belting, comprising bands tightly secured on the ends of each pair of ropes, said bands being depressed between the ropes to receive the hooks, and hooks engaging the bands on each end of the belt and arranged in said depressions in the bands, substantially as and for the purpose described.

Signed at New York, in the county of New York and State of New York, this 2d day of March, A. D. 1894.

JOHN W. HYATT.

Witnesses:
GEORGE ISAKSEN,
WM. O. BELT.